(12) United States Patent
Garside et al.

(10) Patent No.: US 9,081,439 B2
(45) Date of Patent: Jul. 14, 2015

(54) SYSTEMS, METHODS, AND COMPUTER-READABLE MEDIA FOR INVOKING AN ELECTRONIC INK OR HANDWRITING INTERFACE

(71) Applicant: MICROSOFT TECHNOLOGY LICENSING, LLC, Redmond, WA (US)

(72) Inventors: Adrian J. Garside, Sammamish, WA (US); F. David Jones, Redmond, WA (US); Josh A. Clow, Bellevue, WA (US); Judy C. Tandog, Seattle, WA (US); Leroy B. Keely, Portola Valley, CA (US); Tracy Dianne Schultz, Bellevue, WA (US)

(73) Assignee: MICROSOFT TECHNOOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/142,057

(22) Filed: Dec. 27, 2013

(65) Prior Publication Data

US 2014/0111440 A1  Apr. 24, 2014

Related U.S. Application Data

(63) Continuation of application No. 13/560,223, filed on Jul. 27, 2012, now Pat. No. 8,619,053, which is a continuation of application No. 12/501,710, filed on Jul. 13, 2009, now Pat. No. 8,253,708, which is a continuation of application No. 11/083,013, filed on Mar. 18, 2005, now Pat. No. 7,561,145.

(51) Int. Cl.
G06F 3/041 (2006.01)
G06F 3/0354 (2013.01)
G06F 3/0481 (2013.01)
G06F 3/0488 (2013.01)
G06F 3/02 (2006.01)

(52) U.S. Cl.
CPC ............... *G06F 3/0416* (2013.01); *G06F 3/02* (2013.01); *G06F 3/03545* (2013.01); *G06F 3/0481* (2013.01); *G06F 3/04886* (2013.01)

(58) Field of Classification Search
USPC ..................... 345/173; 178/18.01; 715/780
See application file for complete search history.

(56) References Cited

U.S. PATENT DOCUMENTS 8,619,053 B2 * 12/2013 Garside et al. ............... 345/173
2002/0089547 A1 * 7/2002 Huapaya ....................... 345/802

* cited by examiner

*Primary Examiner* — Abbas Abdulselam
(74) *Attorney, Agent, or Firm* — Timothy Churna; Kate Drakos; Micky Minhas

(57) ABSTRACT

User interfaces, methods, systems, and computer-readable media for activating and/or displaying text input systems on display devices may include: (a) displaying a text input system activation target at a user changeable location on a display device; (b) receiving user input directed to the activation target; and (c) activating a text input system in response to the user input. Such user interfaces, methods, and systems further may include (d) displaying a pre-interaction condition of the activation target; (e) receiving user input directed to the activation target in this pre-interaction condition; and (f) changing an appearance of the activation target from the pre-interaction condition to a larger size and/or a different visual appearance in response to this user input. Additional aspects of this invention relate to computer-readable media for providing user interfaces, systems, and methods as described above.

20 Claims, 15 Drawing Sheets

SYSTEMS, METHODS, AND COMPUTER-READABLE MEDIA FOR INVOKING AN ELECTRONIC INK OR HANDWRITING INTERFACE

CROSS-REFERENCE TO RELATED APPLICATION

This application is a continuation of U.S. patent application Ser. No. 13/560,223, filed on Jul. 27, 2012, which is a continuation of U.S. Pat. No. 8,253,708, filed Jul. 13, 2009, which is a continuation of U.S. Pat. No. 7,561,145, filed on Mar. 18, 2005.

FIELD OF THE INVENTION

The present invention relates to user interfaces, methods, systems, and computer-readable media for activating and/or displaying a text input system on a computing system. In at least some examples of this invention, the computing system may constitute a pen-based computing system that is capable of receiving, processing, and/or displaying electronic ink data.

BACKGROUND

As the role of computers has expanded, various different techniques have been developed for entering data into computers. Recently, pen-based computing systems (such as tablet PCs, personal digital assistants, and the like) have gained popularity. One particularly useful technique for entering data in such pen-based computing systems is through the use of handwriting. By writing with a stylus, electronic pen, or other user input device on a digitizer, e.g., to produce "electronic ink," a pen-based computer user can forego the bulk and/or inconvenience associated with use of a conventional keyboard. Handwritten input conveniently may be used, for example, by doctors making rounds, architects on a building site, couriers delivering packages, warehouse workers walking around a warehouse, and/or in any situation when the use of a keyboard would be awkward, inconvenient, and/or undesired. A wide variety of "pen-based computing systems" now are available that allow entry of data via handwriting, e.g., using electronic ink and/or via an electronic pen.

Not all application programs, however, have been designed to accept and/or are capable of accepting user input in the form of electronic ink and/or via an electronic pen. For example, many application programs are incapable of accepting data in a format other than machine-generated text (e.g., input via a conventional keyboard, downloaded, or input in some other manner). When pen-based computing system users open and use such restricted input application programs, attempts to enter electronic ink input into areas or fields that are incapable of accepting such input will result in error messages, ignored input, erroneous input, lost input, and/or other input issues. Such input entry difficulties constitute a source of frustration for users of pen-based computing systems.

FIG. 1A illustrates an example digitizer and/or display screen 10 of a pen-based computing system (e.g., a tablet PC display) on which an application program that is incapable of accepting input in the form of electronic ink is operating (e.g., a word processing application program in this illustrated example). If this tablet PC user has only the computing system's pen or stylus available as an input device, he/she will be incapable of inputting data into this electronic document and/or or otherwise interacting with this application program. In an effort to allow pen-based computing system users to interact with a wide variety of application programs, including the many existing application programs not designed to accept electronic ink input, at least some pen-based computing systems have been equipped with "text input systems" that allow electronic ink and/or other electronic pen input to be "converted" to a form that the application program will correctly recognize and accept. In conventional pen-based computing systems, the text input system can be activated by tapping the electronic pen on an icon 12 provided at the lower left side of the display screen 10, as shown in FIG. 1A (e.g., adjacent the "Start" button in a "toolbar" provided with at least some graphical user interfaces and/or operating systems). In such conventional systems, this icon 12 was a band icon that constituted a property of the pen-based computing system's operating system (e.g., the Microsoft® Windows XP Tablet PC Edition Version 2002 operating system), which allowed bands to be added near the "Start" button.

Tapping the icon 12, in at least some existing pen-based computing systems and/or their operating systems, activated an interface panel 14 through which user input may be entered. For example, as shown in FIG. 1B, a user may write one or more characters in the electronic ink input portion 16 of the interface panel 14 using an electronic pen or stylus. A handwriting recognizer associated with the operating system then was called upon to convert the handwritten electronic ink input to conventional machine-generated text (e.g., ASCII text or the like), and this corresponding recognized and machine-generated text then was inserted into the electronic document, e.g., at the location of cursor 18 when the interface panel 14 was activated and/or at the location of the cursor 18 when the electronic ink was entered into interface panel 14. In this manner, application programs that were incapable of accepting and/or interacting with electronic ink and/or electronic pen input could be adapted to reliably receive input from such sources.

Another example or version of an interface panel 14 for a text input system is shown in FIG. 1C. More specifically, in this illustrated example, the text input system constitutes a "soft keyboard" 20, which enabled users to "type" in the desired textual information (e.g., at the location of cursor 18) using the tip of the electronic pen (or other user input device) to "touch" or "tap" the various keypads of the soft keyboard 20. Again, in this manner, application programs that were incapable of accepting and/or interacting with electronic ink and/or electronic pen input could be adapted to reliably receive input from such sources.

While input systems of the type illustrated in FIGS. 1A through 1C have been useful and effective, these known systems also have certain drawbacks or shortcomings. For example, in at least some conventional systems, the location of the input system icon 12 is fixed at the lower left-hand side of the display screen 10 (e.g., in the lowermost toolbar). Many users find this location somewhat unnatural and/or inconvenient to use (e.g., because many users interact with and operate in the top half to two-thirds of the display screen 10 in a pen-based computing system, locating the text input system icon in the lowest 5% of the display screen 10 has not been found to be very natural or convenient). Additionally, in many instances, users tended to forget the purpose of the icon 12 and/or would activate it only after searching for it (the appearance of the icon 12 in some conventional systems (e.g., as a tiny picture of a keyboard with no associated text) was not readily visible or identifiable by users, thereby failing to provide an immediate visual clue as to the purpose of icon 12). These factors make use of input panel 14 seem a substantial and inconvenient interruption in the data entry process.

Additionally, in at least some circumstances (e.g., for application programs and/or users that prefer to hide this lowermost toolbar), location of the icon 12 and/or activation of the interface panel 14 can be difficult or even impossible.

Additional drawbacks relate to the location and features of the conventional input panel 14 when activated. In at least some conventional systems, interaction with icon 12 activated the input panel 14 only in a "docked" manner. More specifically, as shown by comparing the displayed data of FIG. 1A with that in FIGS. 1B and 1C, when activated, the input panel 14 takes up a certain portion of the overall display screen 10 height, and the remainder of the displayed data is shrunk to fit within the confines of that smaller display area. The changes required to allow this type of resizing and position shifting can be somewhat disorienting and disruptive, and it can result in inaccurate data displays.

Accordingly, there is a need in the art for more convenient and improved user interfaces, systems, and methods that allow use of electronic ink and/or electronic pen data for data entry in various types of systems, application programs and/ or data fields, including systems, application programs, and/ or data fields that have not been designed to accept electronic ink and/or electronic pen input.

SUMMARY

Aspects of this invention relate to user interfaces, methods, systems, and computer-readable media for activating and/or displaying a text input system on a display device. Such user interfaces, systems, and methods may include: (a) displaying a text input system activation target at a first location on the display device, wherein the text input system activation target is displayed at a first size and/or with a first appearance characteristic at least when a user input device hovers proximate to the first location, wherein the first location is changeable in response to user input; (b) receiving a first user input directed to the text input system activation target (e.g., a pen tap, an extended hover action, etc.); and (c) activating a text input system in response to the first user input. Such user interfaces, methods, and systems further may include: (d) displaying a pre-interaction condition of the text input system activation target, wherein the pre-interaction condition includes at least one display condition selected from the group consisting of: a display condition in which no text input system activation target is visible, a display condition in which a text input system activation target of a second size is visible, and a display condition in which a text input system activation target having a second appearance characteristic is visible; (e) receiving a second user input directed to the text input system activation target in the pre-interaction condition; and (f) changing an appearance of the text input system activation target from the pre-interaction condition to the first size and/or the first appearance characteristic in response to the second user input. The second size of the activation target, in at least some manner or dimension, may be smaller than the corresponding dimension(s) of the activation target at the first size. The second appearance characteristic of the activation target, in at least some examples, may be a plain text, faded, lightened, or grayed out version of the activation target as compared with the activation target with the first appearance characteristic. The text input system activation target, in at least some examples of the invention, may be freely positionable by the user, e.g., at any location along the window or screen edges. After use of the text input system, it may be closed or "re-stowed" along the window or screen edge, at its location of last use, and in at least some examples of the invention, the text input system will re-deploy for its next use in the same form, format, and/or state in which it was last used. Still additional aspects of this invention relate to computer-readable media including computer-executable instructions stored thereon for providing various user interfaces for activating and/or displaying a text input system, performing various text input system activating and/or displaying methods, and/or operating various text input activation and/or displaying systems.

BRIEF DESCRIPTION OF THE DRAWINGS

The above and other objects, features, and advantages of the present invention will be more readily apparent and more fully understood from the following detailed description, taken in connection with the appended drawings, in which.

DETAILED DESCRIPTION

I. Terms

Figure 1A:
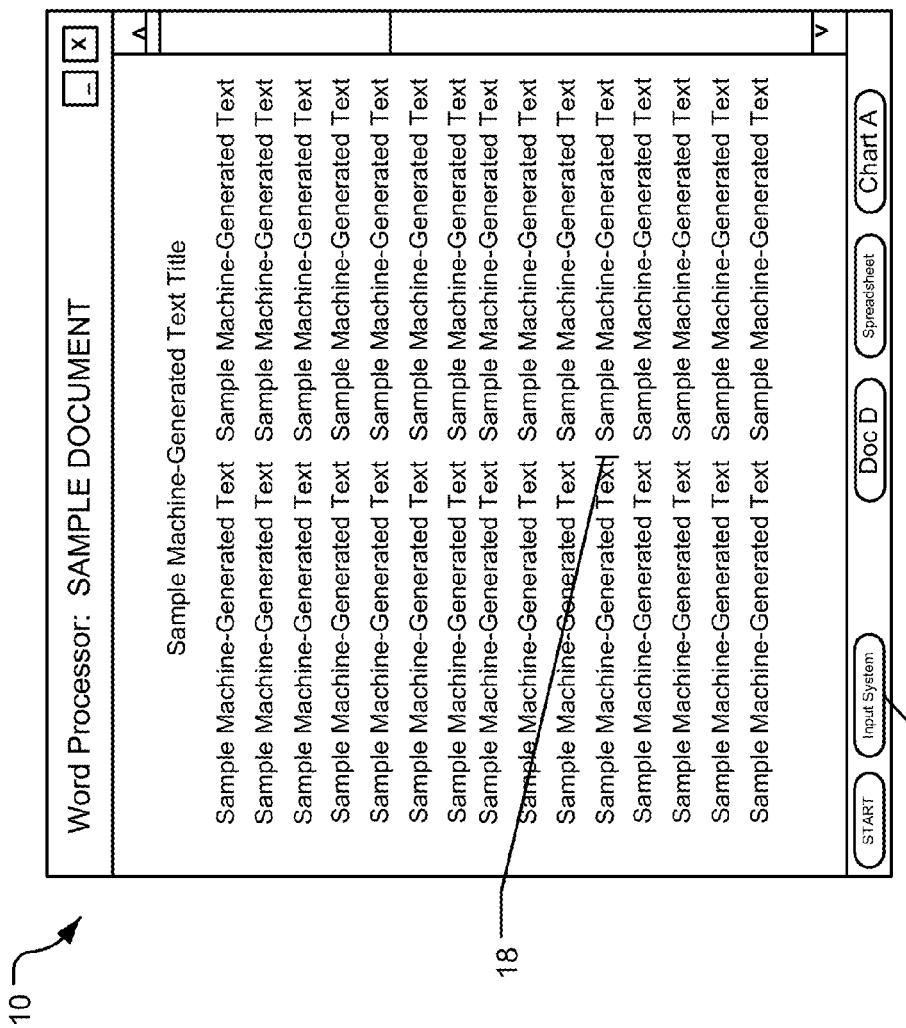
FIGS. 1A through 1C illustrate examples of activation of a text input system in conventional pen-based computing systems.

The following terms are used in this specification and, unless otherwise specified or clear from the context, the terms have the meanings provided below:

"Ink" (also called "digital ink" or "electronic ink")—A sequence or set of handwritten strokes. A sequence of strokes may include strokes in an ordered form. The sequence may be ordered in any suitable manner, such as by the time the stroke was captured and/or by where the stroke appears on a page. Other orders are possible. Electronic ink information may be stored in any desired manner, such as in an "ink serialized format," e.g., a format used for creating, storing, displaying, and manipulating electronic ink data in the Microsoft® Windows XP Tablet PC Edition Version 2002 operating system and/or the Microsoft® Windows Journal software application.

"Point"—Information defining a location in space. For example, a point may be defined relative to a capturing space (for example, points on a digitizer) and/or a display space (the points or pixels of a display device). Points may be represented using a variety of known techniques including two dimensional Cartesian coordinates $(X, Y)$, polar coordinates $(r, \Theta)$, three dimensional coordinates $((X, Y, Z), (r, \Theta, \rho), (X, Y, t$ (where t is time)$), (r, \Theta, t))$, four dimensional coordinates $((X, Y, Z, t)$ and $(r, \Theta, \rho, t))$, and other techniques as known in the art.

"Stroke"—A sequence or set of captured points. A stroke may be determined in a number of ways, for example, using time (e.g., a stroke is all points encountered by the stylus during a predetermined time period or interval), using a predetermined number of points (e.g., a stroke is all points 1 through X where X is predefined), or using stylus contact with the digitizer surface (e.g., a stroke is all points encountered by the stylus between a pen-down event and a pen-up event).

When rendered, the sequence of points making up a stroke may be connected with lines. Alternatively, a stroke may be represented as a point and a vector pointing in the direction of the next point. Further, a stroke may be referred to as a simple list (or array or table) of points. In short, a stroke is intended to encompass any representation of points or segments relating to ink, irrespective of the underlying representation of points and/or what connects the points.

"Pen"—Any type of user input device useful in entering electronic ink into and/or otherwise manipulating or controlling an electronic document and/or a computer operating system. The terms "pen" and "stylus" may be used interchangeably in this specification.

"Pen-Down Event"—An event that is initiated at the time a pen contacts a digitizer. Typically, a pen-down event will end at the time the pen leaves the digitizer surface (also called a "pen-up event" in this specification).

"Hover"—Positioning or locating a pen proximate or adjacent to a digitizer surface but not in contact with the surface, irrespective of whether the pen is moving. No specific time period or cessation of motion at a particular location or position is necessary for an action to constitute a "hover" action. For example, a "hover" may occur during the time period that a user continuously moves a pen toward and into contact with a digitizer surface. A "hover" action also may constitute placement of a pointing device (such as a mouse's pointer) at a specific location in a display without "clicking" one of the mouse's buttons.

"Render" or "Rendered" or "Rendering"—The process of determining how graphics (and/or ink) are to be displayed, whether on a screen, printed, or output in some other manner.

"Computer-Readable Medium"—any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. Example Operating Environment

Figure 2:
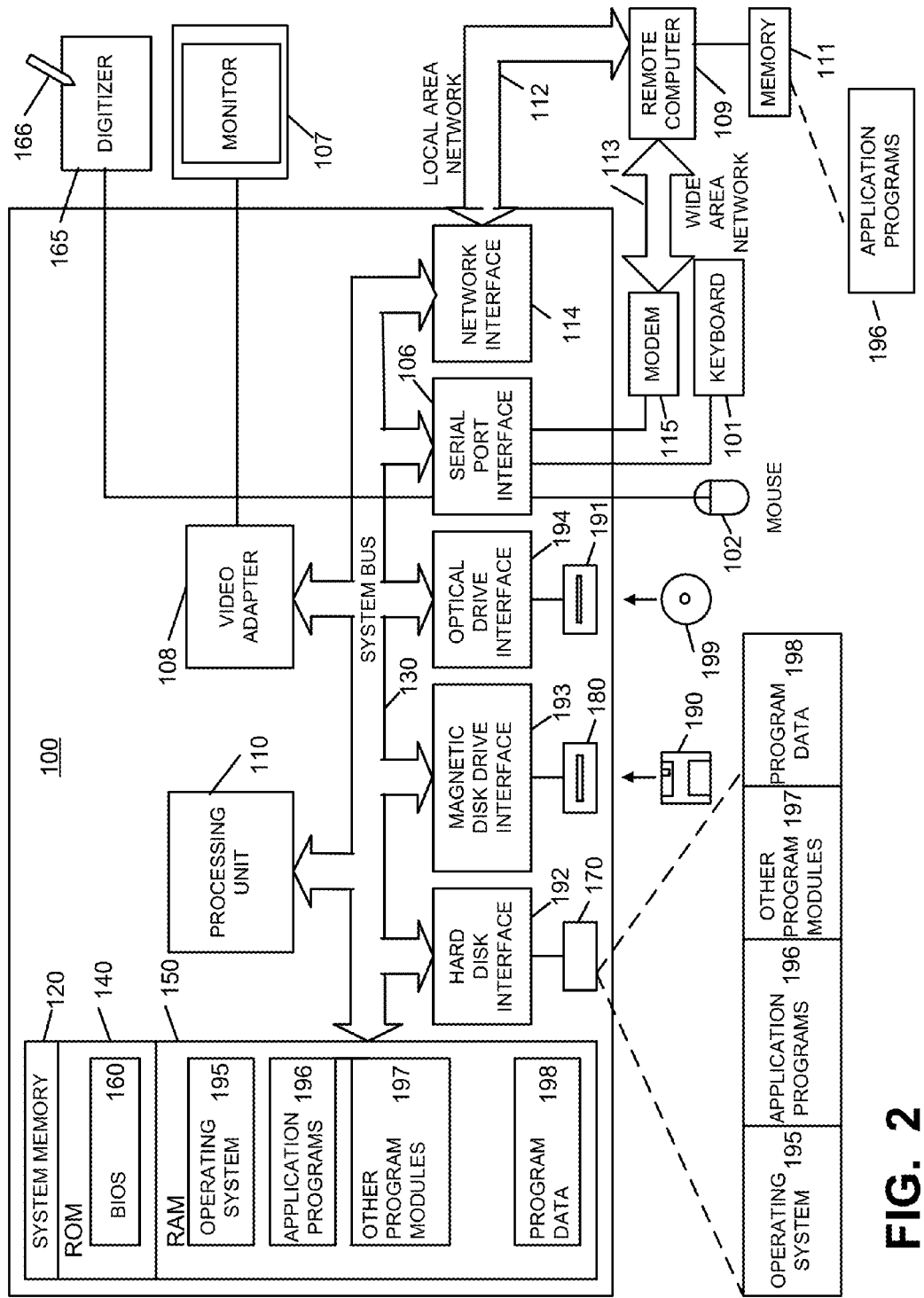
FIG. 2 illustrates a schematic diagram of a general-purpose digital computing environment in which certain aspects of the present invention may be implemented.

FIG. 2 illustrates a schematic diagram of a general-purpose digital computing environment that can be used to implement various aspects of the present invention. In FIG. 2, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide non-volatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 2, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 2, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 2. The logical connections depicted in FIG. 2 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Figure 3:
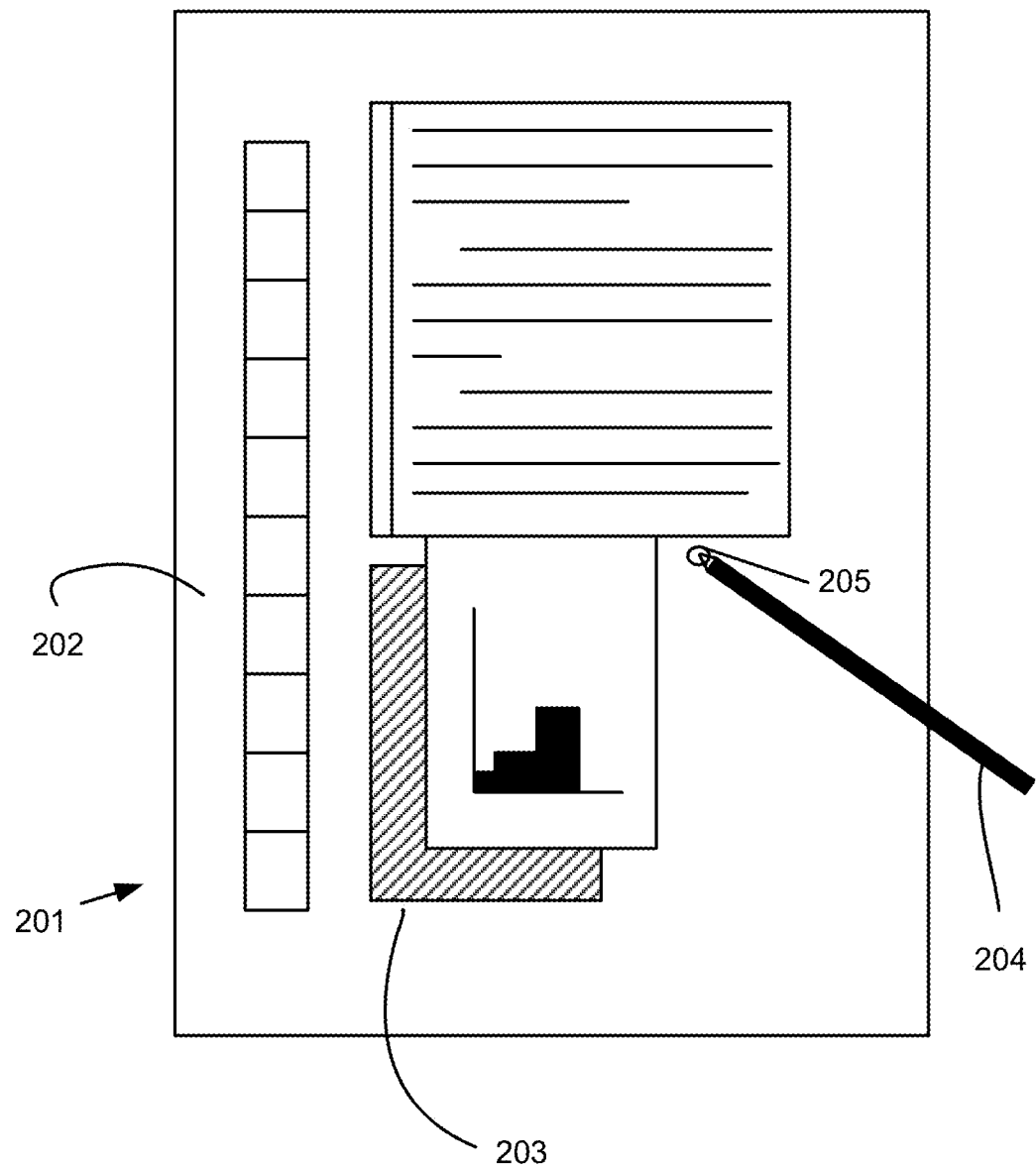
FIG. 3 illustrates a pen-based personal computing (PC) environment in which certain aspects of the present invention may be implemented.

Although the FIG. 2 environment shows an exemplary environment, it will be understood that other computing environments also may be used. For example, one or more examples of the present invention may use an environment having fewer than all of the various aspects shown in FIG. 2 and described above, and these aspects may appear in various combinations and subcombinations that will be apparent to one of ordinary skill FIG. 3 illustrates a pen-based personal computer (PC) 201 that can be used in accordance with various aspects of the present invention. Any or all of the features, subsystems, and functions in the system of FIG. 2 can be included in the computer of FIG. 3. The pen-based personal computer system 201 includes a large display surface 202, e.g., a digitizing flat panel display, such as a liquid crystal display (LCD) screen, on which a plurality of panels 203 is displayed. Using stylus 204, a user can select, highlight, and write on the digitizing display area. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, and touch-sensitive digitizers may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an application program can use to capture, manipulate, and store ink. The ink platform also may include a mark-up language including a language like the extensible markup language (XML). Further, the system may use DCOM as another implementation. Yet further implementations may be used including the Win32 programming model and the .Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or accept electronic pen or stylus input, such as: handheld or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus, or which can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

III. General Overview of The Invention

As mentioned above, aspects of this invention relate to user interfaces, methods, systems, and computer-readable media for activating and/or displaying a text input system on a display device, such as on a display of a pen-based computing system. User interfaces in accordance with at least some examples of this invention may include: (a) a first display mode displaying a text input system activation target at a first size and/or with a first appearance characteristic, wherein the first display mode is displayed at least when a user input device hovers proximate to a location of the text input system activation target, wherein the location of the text input system activation target on the display device is selectable based on user input; and (b) a second display mode displaying the text input system, wherein the second display mode is activated at least when a user interacts in a predetermined manner with the text input system activation target in the first display mode (e.g., by tapping the target, by hovering over it, by hovering over it for an extended time period, etc.). The activation target may be freely positionable by the user along an edge of the panel, window, or screen, e.g., by a user "drag" operation or other desired manner. User interfaces in accordance with at least some examples of this invention further may include a third display mode displaying a pre-interaction condition of the text input system activation target, wherein the pre-interaction condition includes at least one display condition selected from the group consisting of: a display condition in which no text input system activation target is visible, a display condition in which a text input system activation target of a second, smaller size is visible, and a display condition in which a text input system activation target with a second appearance characteristic is visible, wherein the third display mode is displayed at least when no user input device of the activation target is sensed by a digitizer associated with the display device (and in some instances, whenever no hover action near the location of the activation target is sensed). The change between the third and first display modes may occur, for example, when a user input device hovers proximate to the text input system activation target in the pre-interaction condition (e.g., this hover action may change the text input system activation target from a smaller size to a larger size, and/or from a plain text, faded, lightened, unhighlighted, or black-and-white version to a full color, bolded, underlined, italicized, animated and/or other more vibrant or visible condition), to thereby make it easier for the user to see and/or interact with the text input system activation target. Once activated, the second "display mode" may display the text input system in a floating manner above other display areas visible on the display device.

Methods for activating and/or displaying text input systems on display devices in accordance with at least some examples of this invention may include: (a) displaying a text input system activation target at a first location on the display device, wherein the text input system activation target is displayed at a first size and/or with a first appearance characteristic at least when a user input device hovers proximate to the first location, wherein the first location is changeable based on user input; (b) receiving a first user input directed to the text input system activation target (e.g., a tap, a hover action, an extended hover action, etc.); and (c) activating a text input system in response to the first user input. Such methods further may include: (d) displaying a pre-interaction condition of the text input system activation target, wherein the pre-interaction condition includes at least one display condition selected from the group consisting of: a display condition in which no text input system activation target is visible, a display condition in which a text input system activation target of a second size is visible, and a display condition in which a text input system activation target of a second appearance characteristic is visible; (e) receiving a second user input directed to the text input system activation target in the pre-interaction condition; and (f) changing an appearance of the text input system activation target from the pre-interaction condition to the first size and/or the first appearance characteristic (e.g., changing from the second size to the first size and/or changing from the second appearance characteristic to the first appearance characteristic) in response to the second user input. In at least some examples of this invention, the second user input (i.e., to change the activation target from the pre-interaction condition to the first size and/or the first appearance characteristic in the above example) may constitute a user input device hover action proximate to the first location. Additionally or alternatively, in at least some examples of the invention, the first user input described above (i.e., the input that activates the text input system in this example) may constitute a user input device "tap" or "click" of the text input system activation target. Additionally, in at least some examples of this invention, the pre-interaction condition of the text input system activation target may be displayed at least when a user input device is not sensed by a digitizer associated with the display device, and/or the appearance of the text input system activation target may be changed from the pre-interaction condition to the first size and/or the first appearance characteristic at least when a user input device hovers proximate to the text input system activation target in the pre-interaction condition.

Systems for activating and/or displaying text input systems in accordance with examples of this invention may include: (a) a display device (such as a computer display); and (b) a processor system (e.g., a computer processor) programmed and adapted to: (i) display a text input system activation target at a first location on the display device, wherein the text input system activation target is displayed at a first size and/or with a first appearance characteristic at least when a user input device hovers proximate to the first location, wherein the first location is changeable based on user input; (ii) recognize a first user input directed to the text input system activation target; and (iii) activate the text input system in response to the first user input. Systems in accordance with at least some examples of this invention further may include an input system, such as a system for receiving mouse or electronic ink input (e.g., a digitizer screen, etc.). Processor systems used in at least some example systems according to this invention further may be programmed and adapted to: (iv) display a pre-interaction condition of the text input system activation target, wherein the pre-interaction condition includes at least one display condition selected from the group consisting of: a display condition in which no text input system activation target is visible, a display condition in which a text input system activation target of a second size is visible, and a display condition in which a text input system activation target having a second appearance characteristic is visible; (v) recognize a second user input directed to the text input system activation target in the pre-interaction condition; and (vi) change an appearance of the text input system activation target from the pre-interaction condition to the first size and/or the first appearance characteristic (e.g., from the second size and/or second appearance characteristic) in response to the second user input. As described above, in at least some example systems, the second user input (i.e., to change the activation target from the pre-interaction condition to the first size and/or the first appearance characteristic in the above example) may constitute a user input device hover action proximate to the first location, and/or the first user input described above (i.e., the input that activates the text input system) may constitute a user input device "tap" or "click" of the text input system activation target. Additionally, in at least some examples of this invention, the processor system may be programmed and adapted to display the text input system activation target in the pre-interaction condition when a user input device is not sensed by a digitizer, and/or the appearance of the text input system activation target may be changed from the pre-interaction condition to the first size and/or the first appearance characteristic at least when a user input device hovers proximate to the text input system activation target in the pre-interaction condition.

In at least some examples of the invention, the text input system activation target will not be visible (or will be very small) at times when no pen or stylus is sensed by the digitizer. Then, when the presence of a pen or stylus is sensed by the digitizer, e.g., as a hover action, at any location on the digitizer, the activation target then may be made to appear (or optionally, may change its appearance somewhat, if it was already visible). In response to a hover action in close proximity to the activation target's location, the activation target then may expand to its larger size (or otherwise change its appearance characteristics), to make it easier to interact with the activation target (e.g., with a pen tap), and thereby fully deploy the target.

Additional aspects of this invention relate to computer-readable media including computer-executable instructions stored thereon for providing various user interfaces for activating and/or displaying a text input system, performing various text input system activating and/or displaying methods, and/or operating various text input activation and/or displaying systems, including the various user interfaces, systems, and methods described above (and those interfaces, systems, and methods described in more detail below).

IV. Specific Examples of The Invention

As mentioned above, this invention relates to user interfaces, methods, systems, and computer-readable media for activating and/or displaying a text input system on a display device. Some more specific aspects of this invention seek to make location and/or interaction with activation targets for text input systems in pen-based computing systems more natural, convenient, and customizable for users. In at least some examples of the invention, the activation targets for the text input systems will be relatively small in size (at least under some conditions), yet readily visible and located for easy interaction and use by computer users.

Figure 4A:
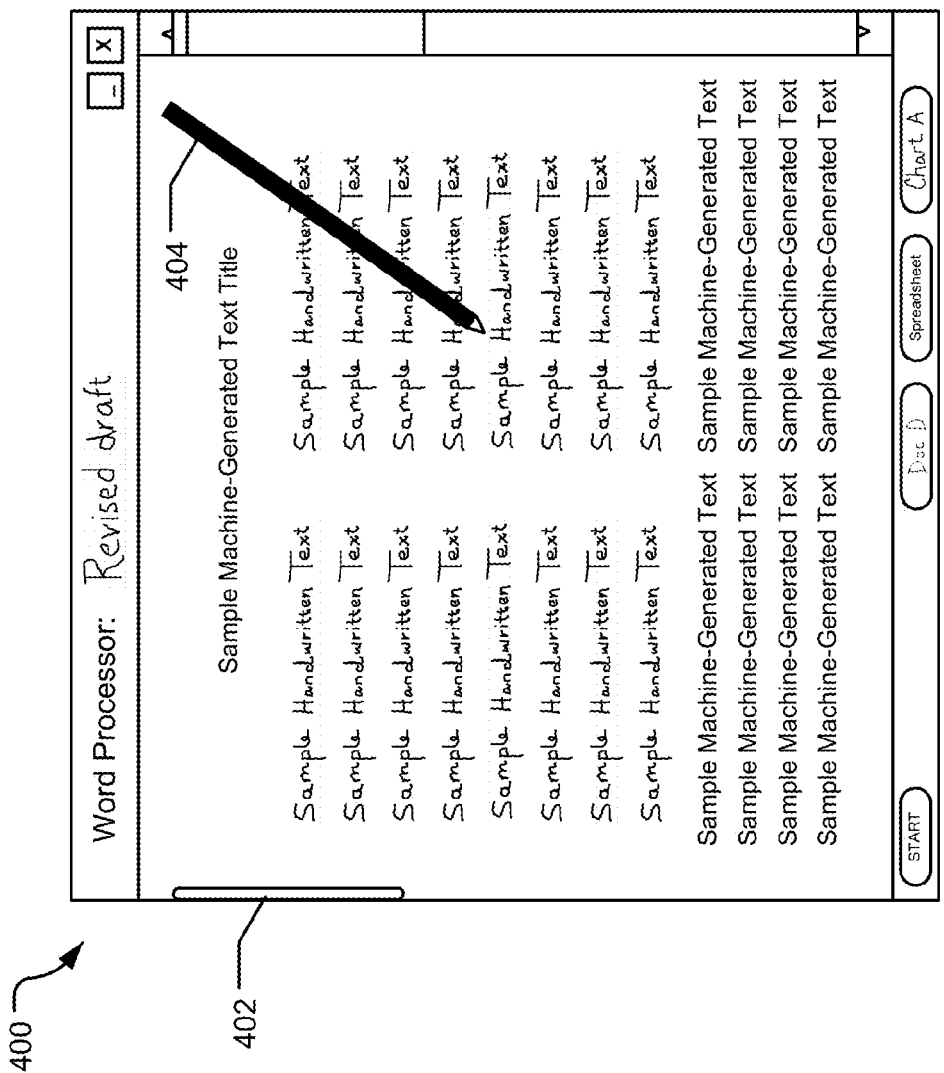
FIGS. 4A through 4D illustrate various example features of activation targets and text input systems and their use in accordance with examples of this invention.

FIGS. 4A through 4D generally illustrate an example of a user interface for activating and/or displaying a text input system on a display device 400, such as on a display device 400 of a pen-based computing system (which may include an associated digitizer, as described above). FIG. 4A illustrates an example text input system activation target (or icon) 402 used to activate the text input system according to examples of this invention in a "pre-interaction" state. The "pre-interaction" state 402 of the text input system activation target of this example is a "collapsed" (or smaller sized) state. As will be described in more detail below, user interaction with the target 402 in the pre-interaction state or condition will cause the target to expand to a larger size in this example system and method.

The "pre-interaction" state of text input system activation target 402 may exist at various times while an application program and/or an overall computer operating system is running. For example, the text input system activation target 402 may be present in its pre-interaction state as a default state, e.g., whenever the application program and/or operating system is running and the user input device (such as an electronic pen or stylus 404) is not interacting with the text input system activation target 402 and/or hovering at, near, or over a location of the text input system activation target 402 (e.g., within a few inches of text input system activation target 402). The pre-interaction state of text input system activation target 402 may be a "collapsed" state in which the target 402 appears relatively small or narrow, e.g., at a width or height that would make it somewhat difficult for a user to directly and reliably engage with the activation target 402, such as 4-5 pixels wide, or even less. While narrow, however, the collapsed state of the activation target 402 in this example remains readily visible, and its location (e.g., along the side of the display device and/or along a side edge of an active display portion or panel with focus, e.g., where the user is working) readily reminds the user of the text input system's presence and availability.

As is known in the pen-based computing system art, at least some electronic pens or styli 404 may be detectable by a digitizer or other portion of the pen-based computing system when the pen or stylus 404 is located relatively close or adjacent to the digitizer surface (the digitizer surface may coincide with and/or be located adjacent the display screen, such as the screen of display device 400). For example, some pens or styli 404 are "active," which in this specification means that they transmit, reflect, alter, or otherwise modify energy, data, or other information transmitted, sensed, and/or detectable by a digitizer when the pens or styli 404 are located within a certain range of the digitizer surface. As more specific examples, some pens or styli 404 may include circuitry or other structures that receive energy emitted by the digitizer and/or alter magnetic or electronic fields transmitted by and/or sensed by the digitizer, such that the presence of the pens or styli 404 can be sensed by the digitizer due to changes in detected magnetic or electric fields (e.g., at least when the pens or styli are close to the digitizer surface). As other examples, some pens or styli 404 may transmit or reflect data, electrical or magnetic fields, or other energy or information that are detectable by the digitizer (at least when located in proximity thereto). Any suitable or desired way of sensing or detecting the presence of a pen or stylus 404 (or other user input device) when it is located near a display device screen 400 (including sensing or detecting the presence of "inactive" user input devices) may be used in accordance with this invention. Although a stylus 404 and digitizer combination may be designed to allow detection of a stylus 404 at virtually any reasonable position with respect to the digitizer surface 400, in at least some conventional pen-based computing systems, the stylus 404 will be initially detectable when it is about one-half to two inches from the digitizer surface 400, and in some examples, when it is approximately a half inch to an inch from the digitizer surface 400. Of course, aspects of this invention may be practice both with "active" pens or other input devices, as well as with inactive input devices, including with touch screen systems.

Figure 4B:
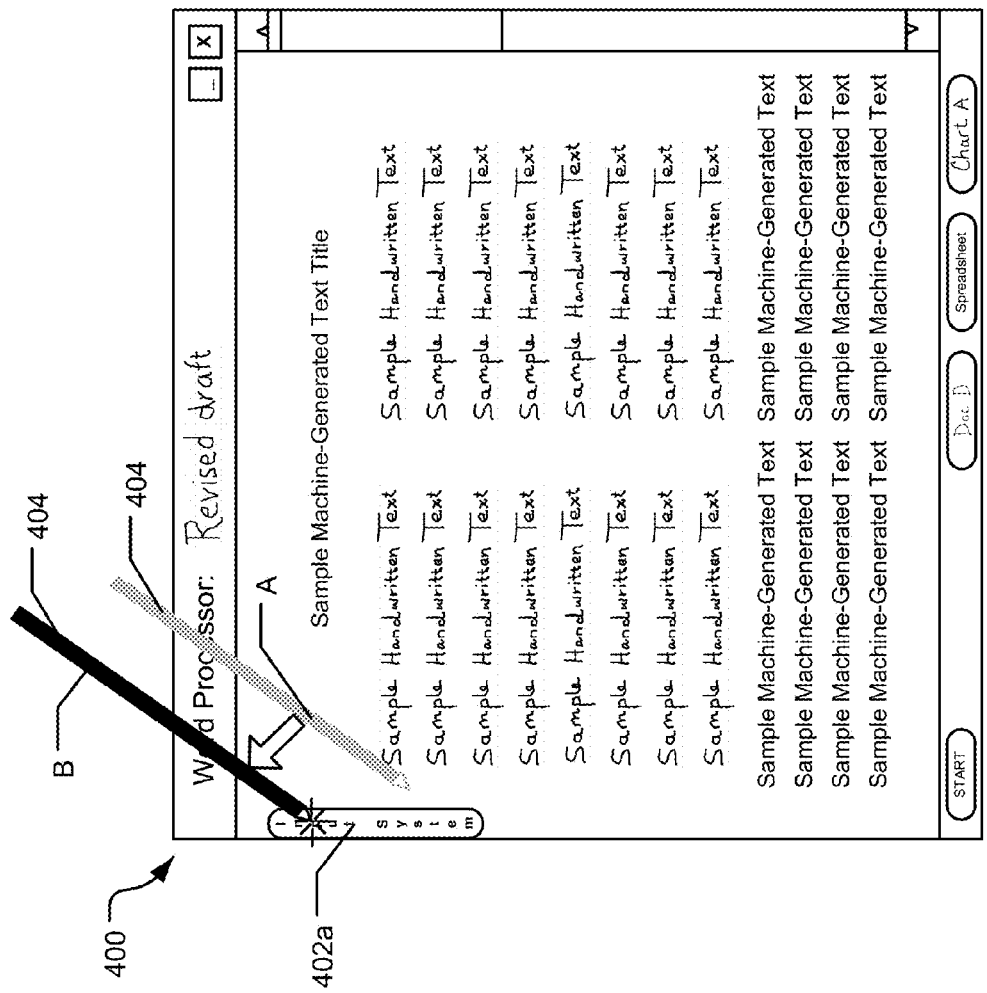

Hovering a pen or stylus 404 at or near a location of the pre-interaction activation target 402 (e.g., within about two inches or less) in this example of the invention will change the appearance of the activation target from its pre-interaction state 402 (an example of which is shown in FIG. 4A) to its post-interaction state (e.g., to an expanded or enlarged state 402a. as shown in FIG. 4B). In its expanded state 402a. the activation target is enlarged and readily tapable, e.g., by the electronic pen 404, which, as noted above, had been hovering near the activation target to change it from its collapsed state 402 to its expanded state 402a. The size and/or appearance of the activation target may change in any suitable or desired manner from the pre-interaction state to the post-interaction state without departing from the invention. For example, in its pre-interaction state 402, the activation target may be narrower and/or shorter than the activation target in its post-interaction state (e.g., where it may be in an expanded or enlarged state 402a). As another example, in its pre-interaction state 402, the activation target may be "grayed out," faded, lightened, in plain text, and/or otherwise (e.g., visually or audibly) indicated as "inactive," and it may change to an "active" state (e.g., in full color, underlined, bolded, italicized, highlighted, animated, and/or otherwise (visually or audibly) indicated as active) when the pen 404 is located nearby, e.g., when the pen 404 is detected in a hover position near target 402 (optionally, with or without a physical size change of the icon 402). Of course, any way of changing the activation target 402 from an inactive to an active state (and vice versa) and/or any way of informing the user of this state change may be used without departing from this invention.

Figure 1B:
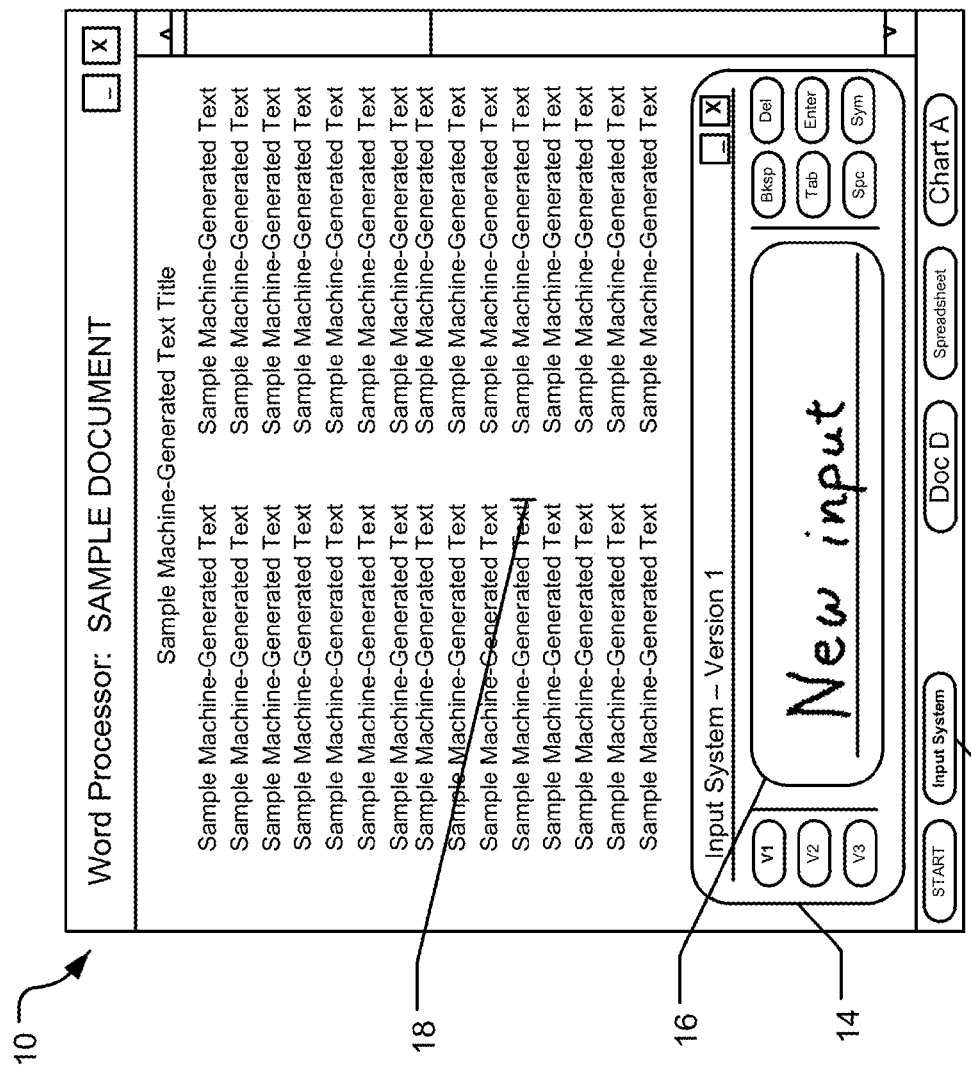
Figure 1C:
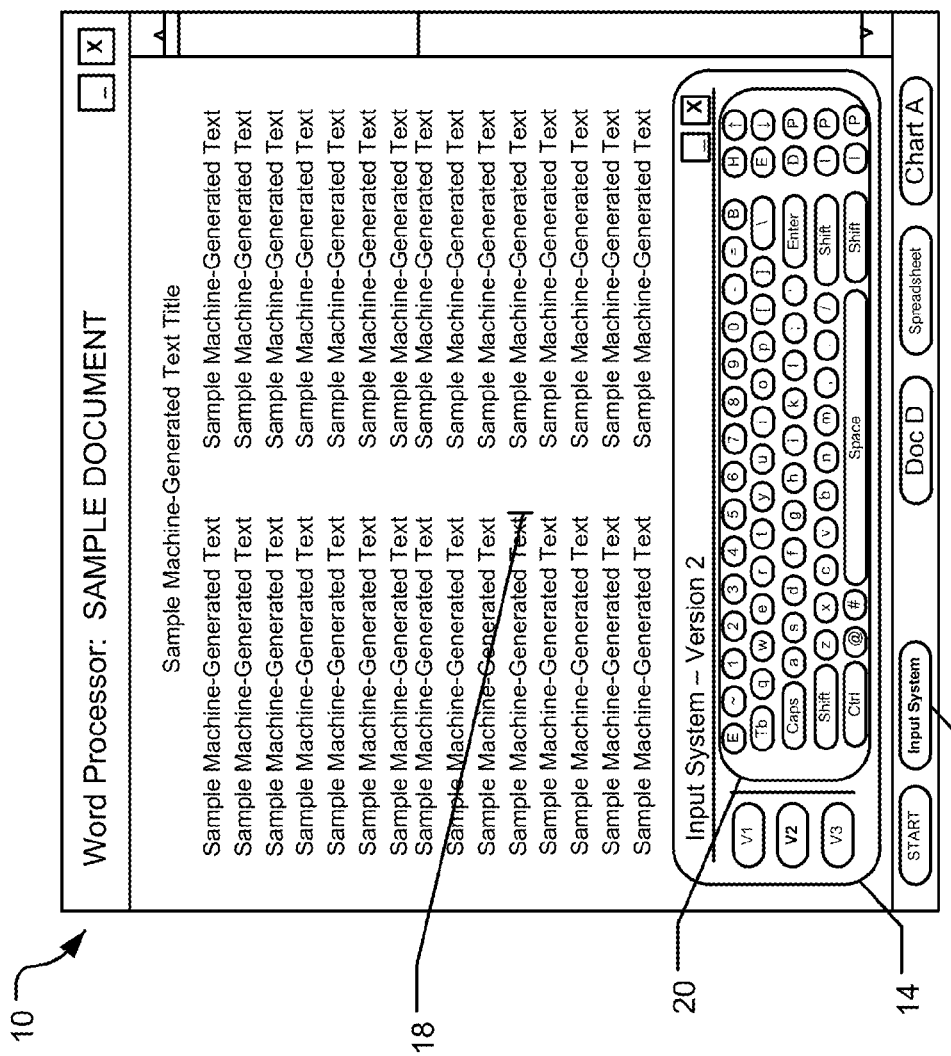
Figure 4C:
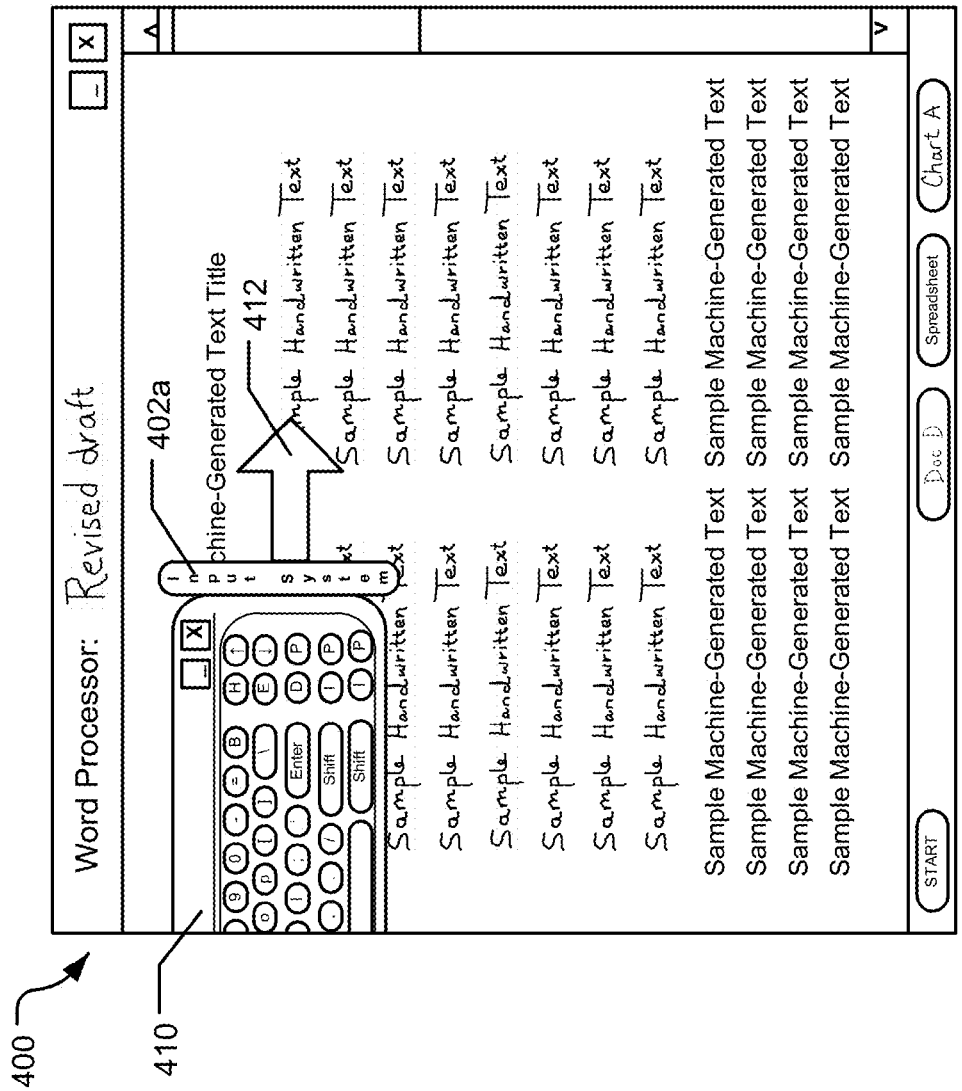

Further user interaction with and/or input directed to the expanded (or post-interaction) activation target 402a may be used to activate and/or display a text input system, such as the various types of text input systems described above in conjunction with FIGS. 1B and 1C (e.g., a handwriting input panel, a soft keyboard, or the like). For example, as shown in FIG. 4B, movement of the pen 404 from its hover position (position "A") to a position where it temporarily contacts the digitizer and/or display surface 400 at or near the location of the expanded activation target 402a (e.g., position "B" where the pen 404 tip "taps" the display surface 400 at or near the location of the expanded activation target 402a) will activate the text input system and cause it to be displayed in this example structure. For example, as shown in FIG. 4C, this "tapping" action may cause a soft keyboard 410 (or any desired type of text input system) to be displayed. While the text input system (e.g., soft keyboard 410) may be displayed in any desired manner without departing from this invention, in this illustrated example, tapping the activation target in its expanded state 402a will initiate an animation in which it appears that the soft keyboard 410 (or other text input system) scrolls out from the left side of the display screen 400 in the direction of arrow 412 at the initial height at which the expanded activation target 402a was located. This animation or scrolling action associates and reinforces the purpose and function of activation targets 402 and/or 402a in the user's mind, and the continued presence of the activation target 402a at the far right side of the displayed soft keyboard 410 during the scrolling or animation action further associates and reinforces the purpose and function of activation target 402a in the user's mind. Of course, if desired, the activation target 402a need not appear while the text input system is deploying.

Figure 4D:
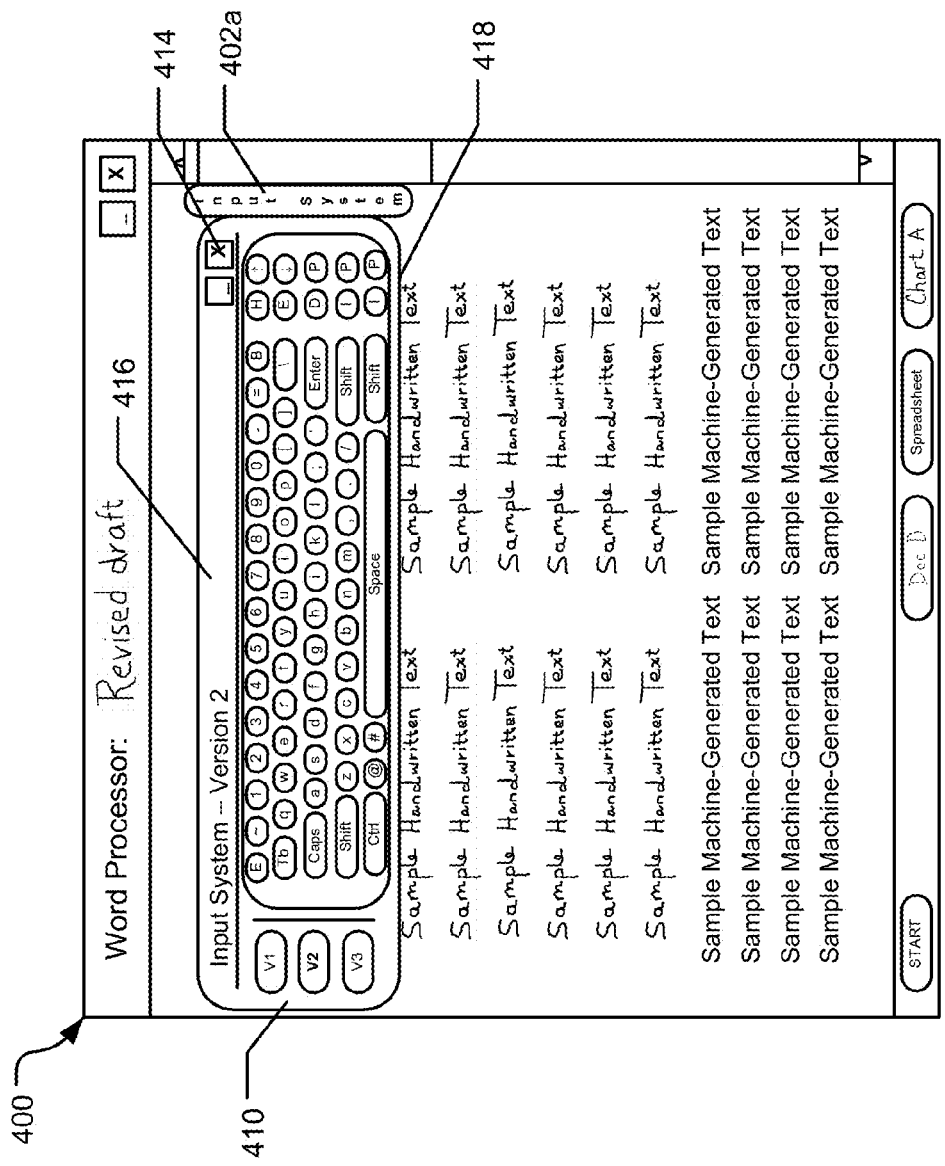

FIG. 4D illustrates an example of display device 400 with the text input system (e.g., soft keyboard 410) fully deployed. As shown, in this illustrated example, the soft keyboard 410 (or other text input system) remains displayed at the initial height of the expanded activation target 402a and centered within the display portion, and the continued presence of the activation target 402a at the far right side of the displayed soft keyboard 410 further associates and reinforces the purpose and function of activation target 402a in the user's mind. Of course, if desired, the activation target 402a need not remain displayed with the fully deployed text input system.

If desired, the user may change the size and/or location of the soft keyboard 410 (or other text input system). For example, in at least some example user interfaces, systems, and methods according to this invention, a user may readily change the location of the text input system by setting the pen tip down in a border 416 of the input system and dragging the text input system to the new, desired location before the pen tip is lifted from the display device surface 400. As another example, if desired, the size of the text input system may be adjusted by setting the pen tip down at an edge or boundary of the system (e.g., edge 418) and dragging the edge to the desired new size. Any edge or corner of the boundary may be used for size adjustment, as is known in the art. Users also may control the location at which the text input system stops scrolling across the screen (such that it will not necessary always center in the open panel in which it is activated), if desired. Such size and location changing techniques are known and used in the art.

In at least some example user interfaces, systems, and methods according to the invention, the text input system will remain visible and available until positively closed by the user. Optionally, if desired, systems and methods according to at least some examples of the invention may automatically close the text input system after a certain amount of time of non-use. In any event, the text input system can be re-stowed in any suitable or desired manner without departing from the invention. For example, the user could indicate that he/she has finished using the text input system by tapping the pen in the system's "close" icon 414, by again tapping the expanded activation target 402a. by hovering over the activation target 402a located at the edge of the text input system, and/or in any other desired manner. The text input system may disappear in any desired manner, such as by simply disappearing or fading away, by scrolling back to the left side of the display 400 (opposite the scrolling animation described above in connection with FIGS. 4B and 4C), using some other animation procedure, or the like. In at least some examples of the invention, once the text input system is closed, the display 400 will return to the state shown in FIG. 4A with the activation target in its collapsed or other pre-interaction state 402. Optionally, if desired, after the text input system is closed, the system could return the display 400 to the state shown in FIG. 4B for a short time (with the expanded activation target 402a displayed), and then finally return to the collapsed state 402 shown in FIG. 4A if there is no user interaction with the expanded activation target 402a within a predetermined time period and/or if the user undertakes other action away from animation target 402a. Of course, many variations in the manner and/or appearance of the display 400 and/or activation targets 402 and/or 402a may be used without departing from this invention.

After use and/or closure of the text input system, systems and methods according to the invention may return and/or display the activation targets 402 and/or 402a at any desired location without departing from the invention. For example, in some user interfaces, systems, and methods, the text input system will return and/or the system will display the activation targets 402 and/or 402a at the same side of the display screen 400 from which it was originally activated and at the height along the display 400 side where the text input system was last located and/or used (e.g., at the same height it originally deployed or at a different height, if the user changed the location of the text input system during use). As another example, if desired, at least some user interfaces, systems, and methods may return the text input system and/or display the activation targets 402 and/or 402a at the same side from which it was originally activated and at the same height at which the activation targets 402 and/or 402a were previously displayed. Other combinations of text input system return and/or new activation target display locations may be used without departing from this invention.

As another alternative and/or as an additional feature, rather than and/or in addition to tapping the activation target 402a with the pen tip to activate the text input system, the system may be activated when/if an extended hover action over the activation target 402a (e.g., for more than a predetermined time period) is detected. Also, if desired, in at least some example systems and methods according to the invention, moving the pen 404 away from the digitizer/display screen 400 without tapping the activation target 402a. tapping a location other than the activation target 402a. and/or moving the pen to hover at a location away from the activation target 402a without tapping it, and the like, may be detected by the systems and methods and used to initiate a change in the activation target from its expanded or post-interaction state 402a (as shown in FIG. 4B) back to its collapsed or pre-interaction state (as shown in FIG. 4A) without activation of the text input system. In at least some examples of the invention, an extended hover action over the expanded activation target 402a also may be detected and used to initiate a change in the activation target from its post-interaction state 402a back to its pre-interaction state without activation of the text input system, e.g., if the hover lasts longer than a predetermined time period.

Figure 5A:
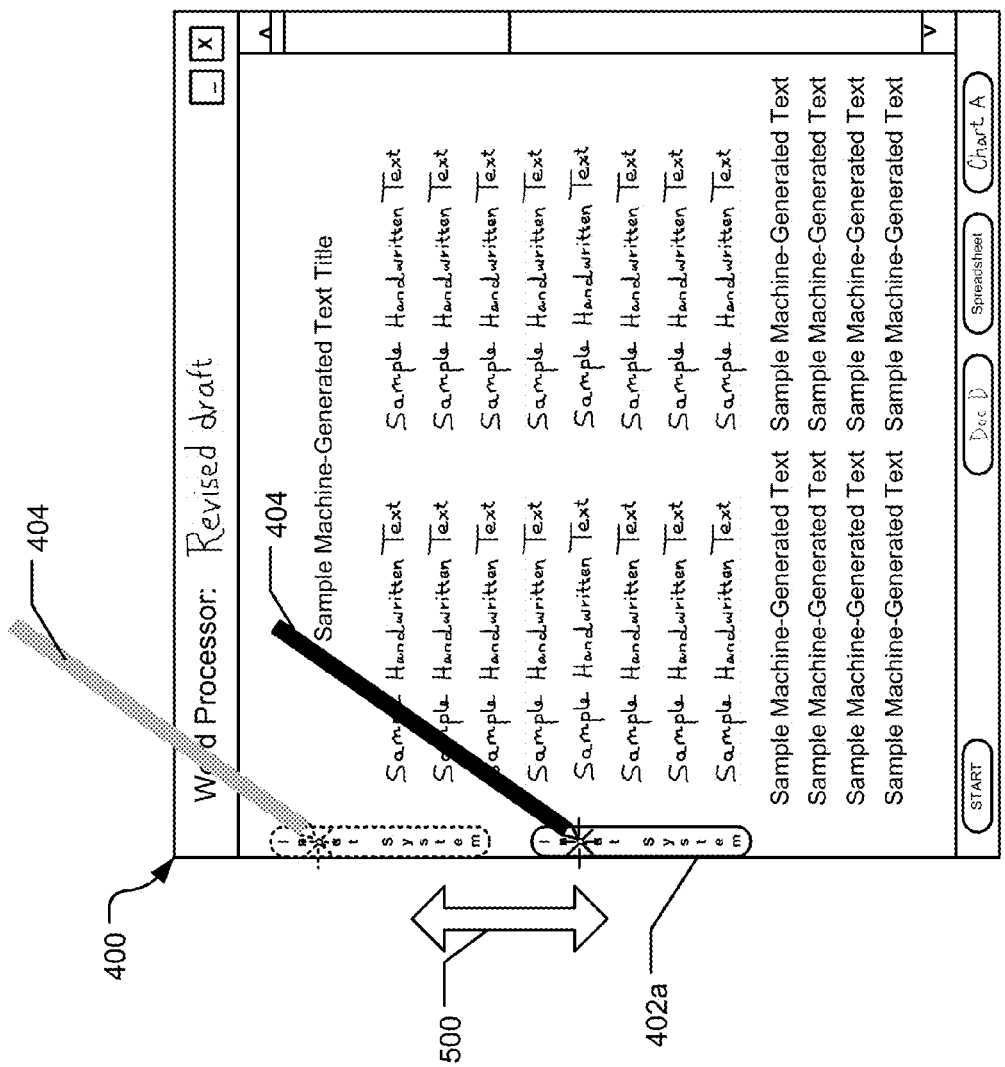
FIGS. 5A through 5F illustrate various additional example features of activation targets and text input systems and their use in accordance with examples of this invention.
Figure 5B:
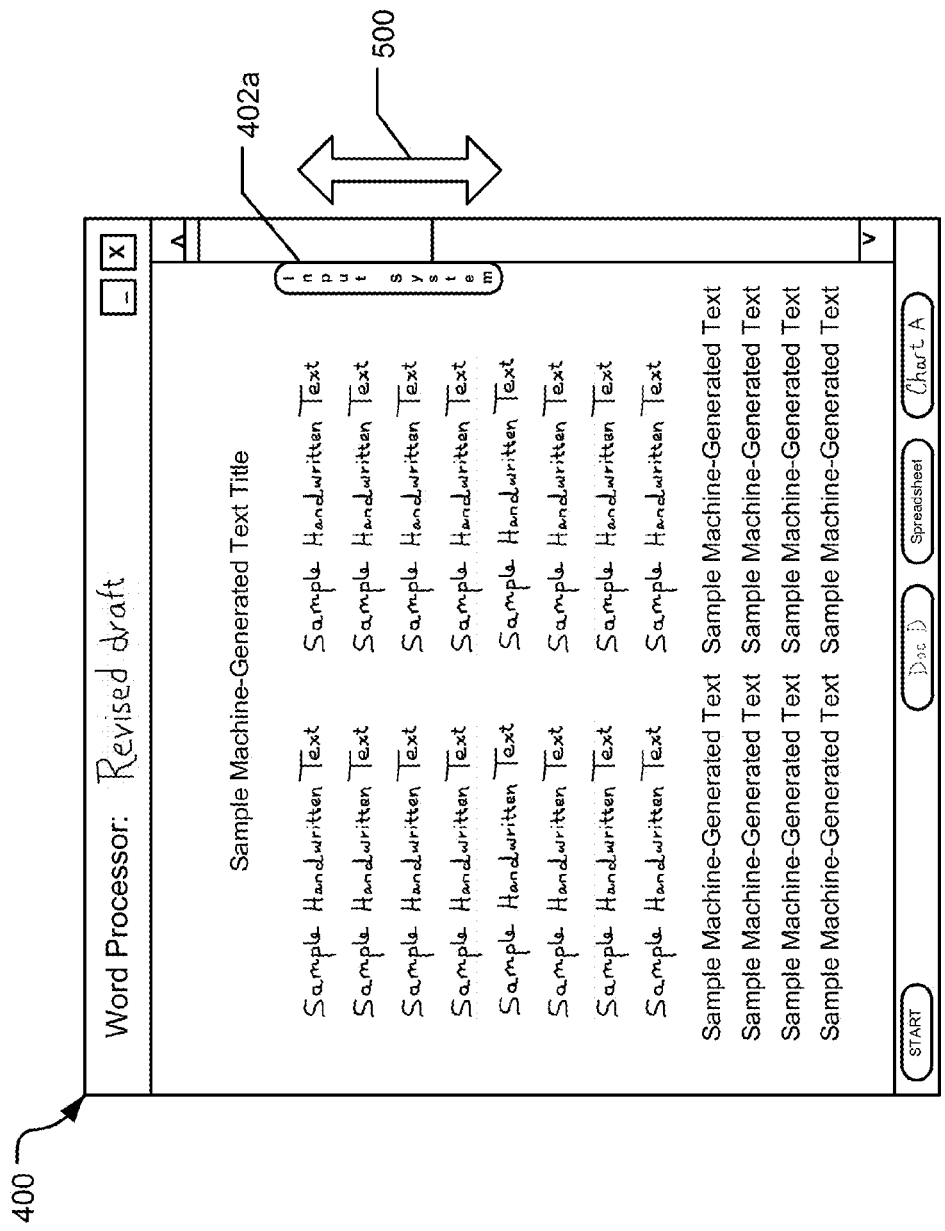

FIGS. 5A through 5F illustrate examples of various additional features that may be available in accordance with at least some examples of the invention that make the text input system and its activation targets more versatile, customizable, and user friendly. For example, as shown in these figures, the location of the activation targets 402 and/or 402a may be freely selected by the user, e.g., based on his or her work preferences and/or individual needs or desires. As shown in FIG. 5A, the activation target 402a (and hence the target in its pre-interaction state 402) may be freely changed along the left edge of the display and/or active panel (as illustrated by arrow 500). While movement of the activation target 402a may be accomplished in any desired manner without departing from the invention, in at least some examples, the activation targets 402 and/or 402a may be freely moved along the display or active panel edge by setting the pen 404 tip down within the activation target 402a (shown in broken lines and grayed in FIG. 5A) and dragging the target 402a to the new, desired height or location (shown in solid and black lines), using the pen 404, before the pen 404 tip is lifted from the display device surface 400. As one more specific example, movement of the pen 404 tip more than a predetermined distance (e.g., more than 5 pixels) during a pen-down event within the boundaries of the activation target 402a may be sufficient to initiate this target movement action (e.g., movement of the pen 404 a distance longer than that observed during a typical pen "tap" may be used to distinguish the desire to enter the activation target movement mode from the desire to simply activate the text input system by tapping the target 402a). As another example, if desired, a pen-down event within the boundaries of the activation target 402a may be required to last more than a predetermined time period in order to activate the target movement procedure (e.g., a "press-and-hold" action of the pen within the target 402a boundaries to produce a pen-down time longer than a typical pen down time during a tap may be used to distinguish the desire to enter the activation target movement mode from the desire to activate the text input system by tapping the target). As still additional examples, if desired, a user could activate an activation target movement mode from a menu, such as from a toolbar menu; by highlighting the target and then moving it with the pen, mouse, or keyboard; etc.

Due to typical pen 404 holding angles and the like, right-handed pen users typically prefer locating the activation targets 402 and/or 402a somewhere along the left hand side of the display 400 or the active display portion (e.g., the portion of the display 400 having focus and/or accepting user input if several programs or display panels are open). Left-handed pen users, on the other hand, typically prefer locating the activation target 402a along the right hand side of the display device 400 or the active display portion. Therefore, activation targets 402 and/or 402a in accordance with at least some examples of this invention also may be freely locatable along the right hand side of the display device 400 or the active display portion, as illustrated by arrow 500 in FIG. 5B. If desired, the activation targets 402 and/or 402a may be freely movable from one side of the display screen 400 to the other, e.g., by the pen dragging action described above and dragging the target 402a to the opposite lateral side of the display 400. As a more specific example, if a user drags the target 402a more than a predetermined widthwise distance across the display screen 400 (e.g., more than halfway across), this action may be used to trigger systems and methods according to examples of this invention to place and/or display the activation target 402a on the other side of the display screen 400. As still another example, if desired, by detecting a specific user's pen angle or tilt at a given time, systems and methods according to at least some examples of the invention may determine whether the user is holding the pen in his/her right or left hand, and the systems and methods may locate the activation targets 402 and 402a along the left or right edges of the display screen 400 based on this determination, e.g., to the left side for right handed users and to the right side for left-handed users (while optionally giving the user an opportunity to override this automatic selection). Of course, other ways of moving and/or locating the activation targets 402 and/or 402a may be used without departing from the invention. The text input system may scroll out from the right hand side of display screen 400 and/or otherwise be activated in a manner similar to that described above in conjunction with FIGS. 4A through 4D. Of course, any activation animation, appearance, and/or features may be used without departing from this invention.

Figure 5C:
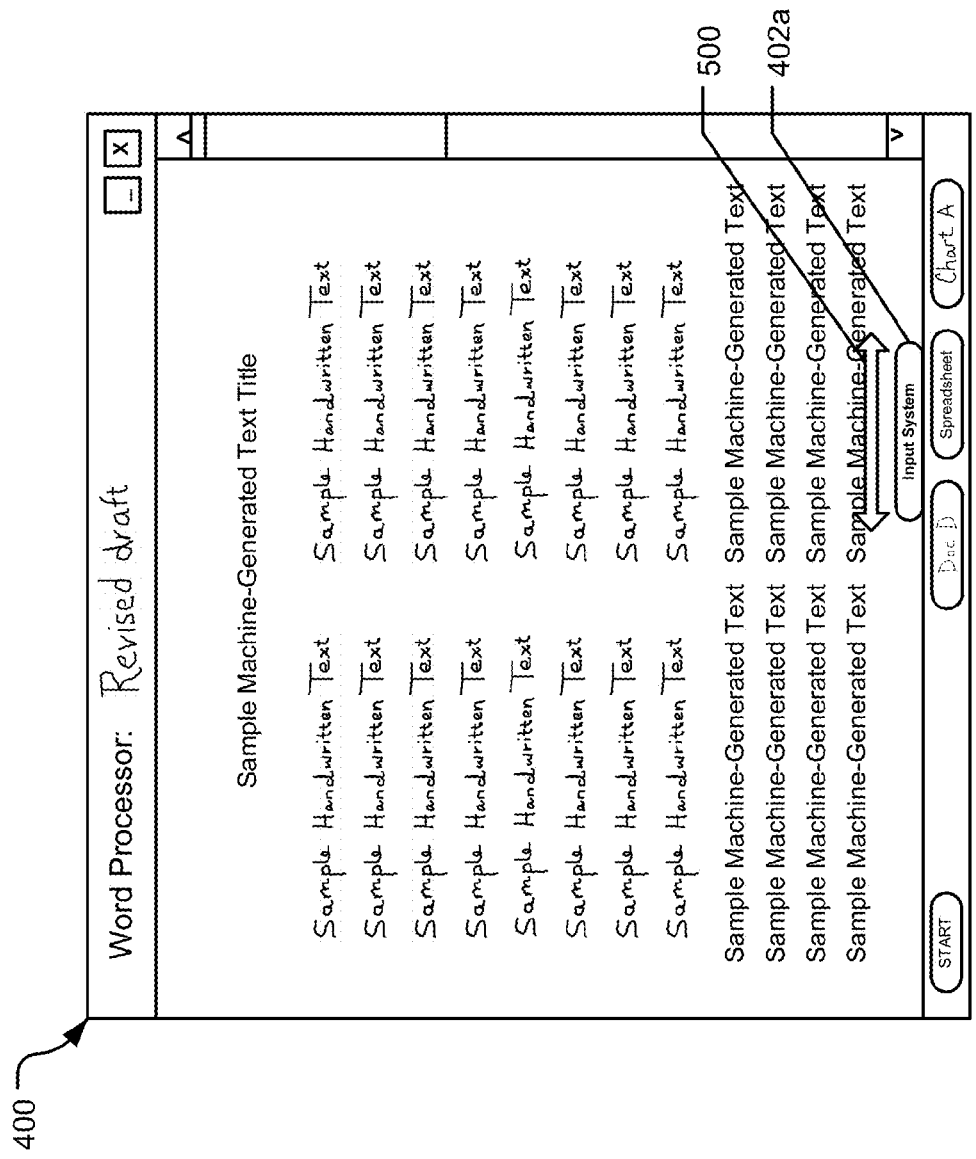
Figure 5D:
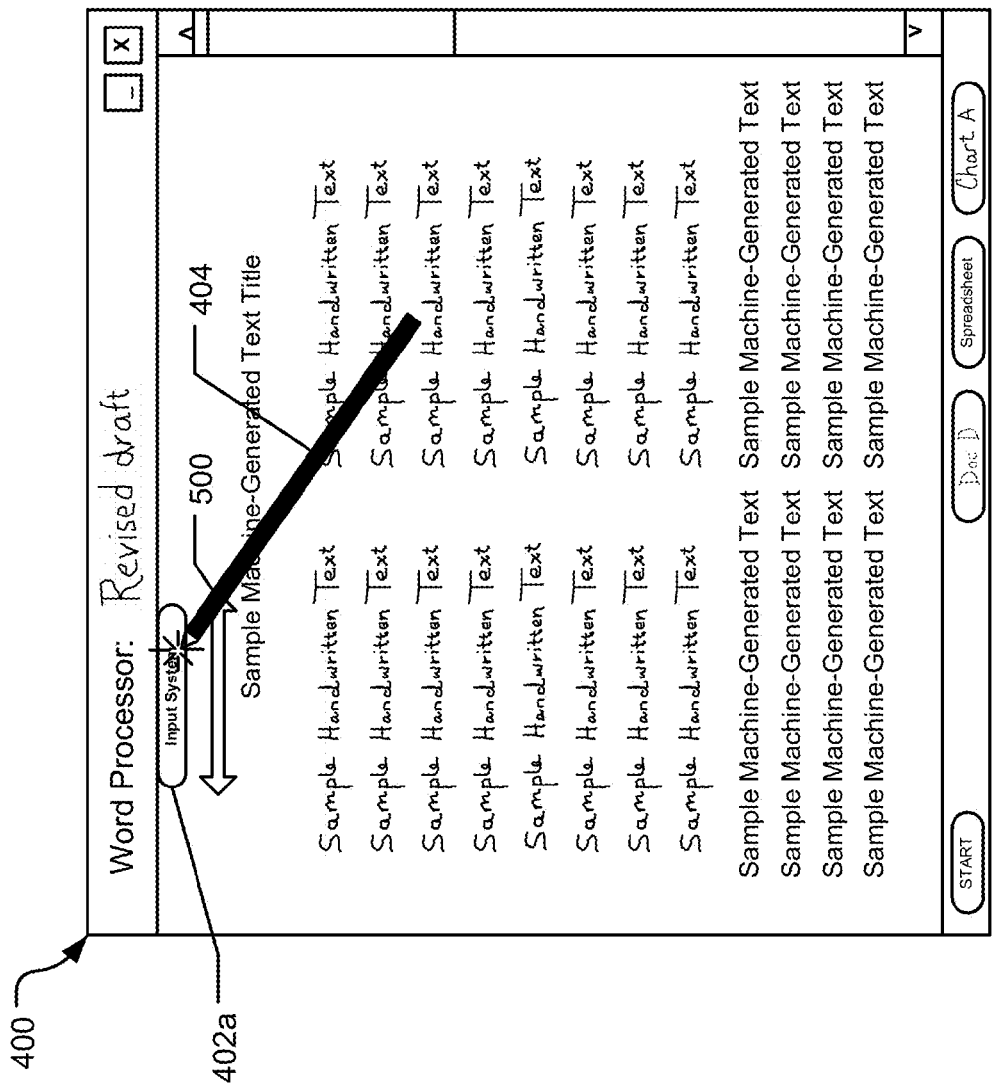

Activation target 402 and/or 402a locations are not limited to the lateral sides of a display device 400. Rather, as shown in FIGS. 5C and 5D, activation targets 402 and/or 402a also may be located along the bottom and/or top edges of a display device 400 and/or along the bottom and/or top edges of an active display portion or open panel of a display device 400. As with the side located targets 402 and/or 402a, the locations of the activation targets 402 and/or 402a may be freely selected by the user, e.g., using a pen touch and drag action or other desired action, as described above in conjunction with FIG. 5A and as indicated by arrow 500 in FIGS. 5C and 5D.

When placing the activation target 402 and/or 402a along the bottom edge of the display screen 400, in order to prevent the text input system from deploying all or partially off the visible screen display area, systems and methods according to at least some examples of this invention will not permit the activation target 402 and/or 402a to be dragged to a vertical position below the lowest position where floating can be achieved. If the user continues to drag the activation target 402 and/or 402a below this level, then the target of this example will snap to the bottom level (e.g., and optionally change its appearance to the appearance and/or orientation shown in FIG. 5C). Optionally, the text input system may default to operation in a docked mode when the targets 402 and/or 402a are placed along this edge, as will be described in more detail below. Similar actions may result, for example, when activation targets 402 and/or 402a are dragged to locations higher than a predetermined height along a lateral side edge, e.g., as shown in FIG. 5D.

Figure 5E:
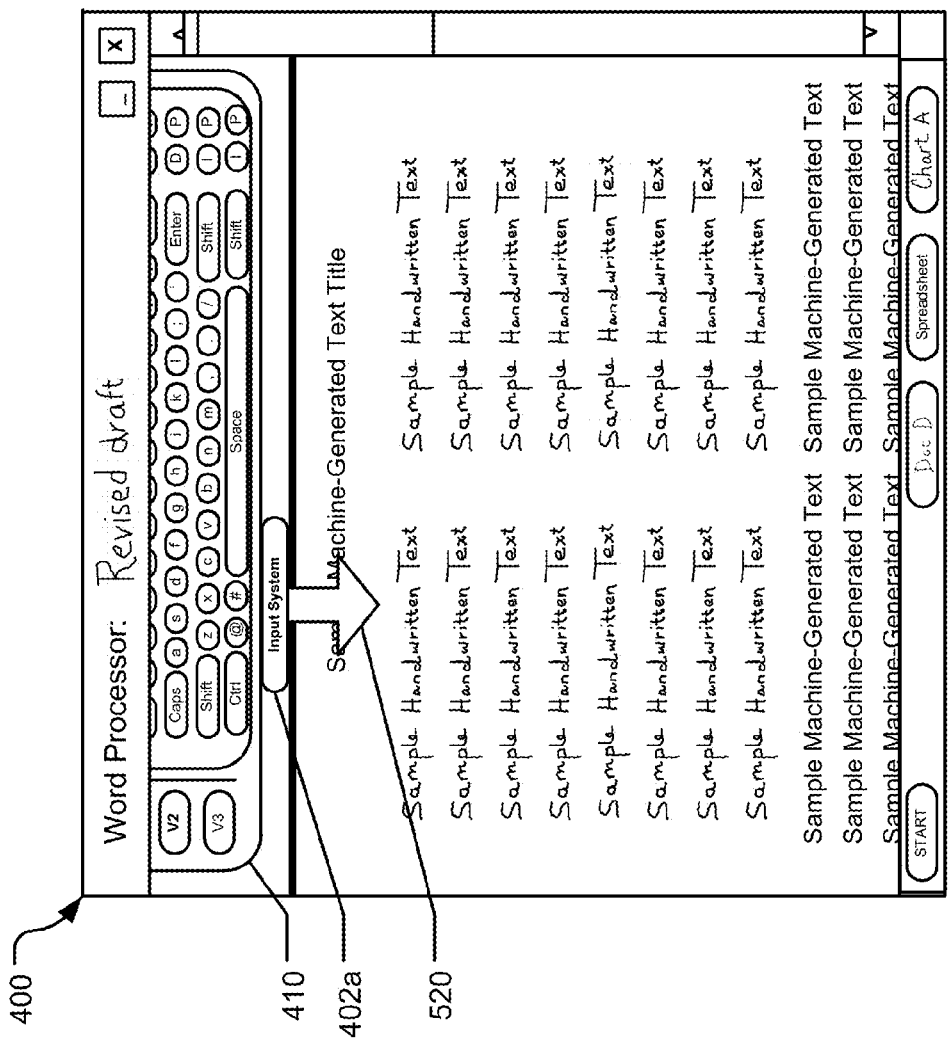
Figure 5F:
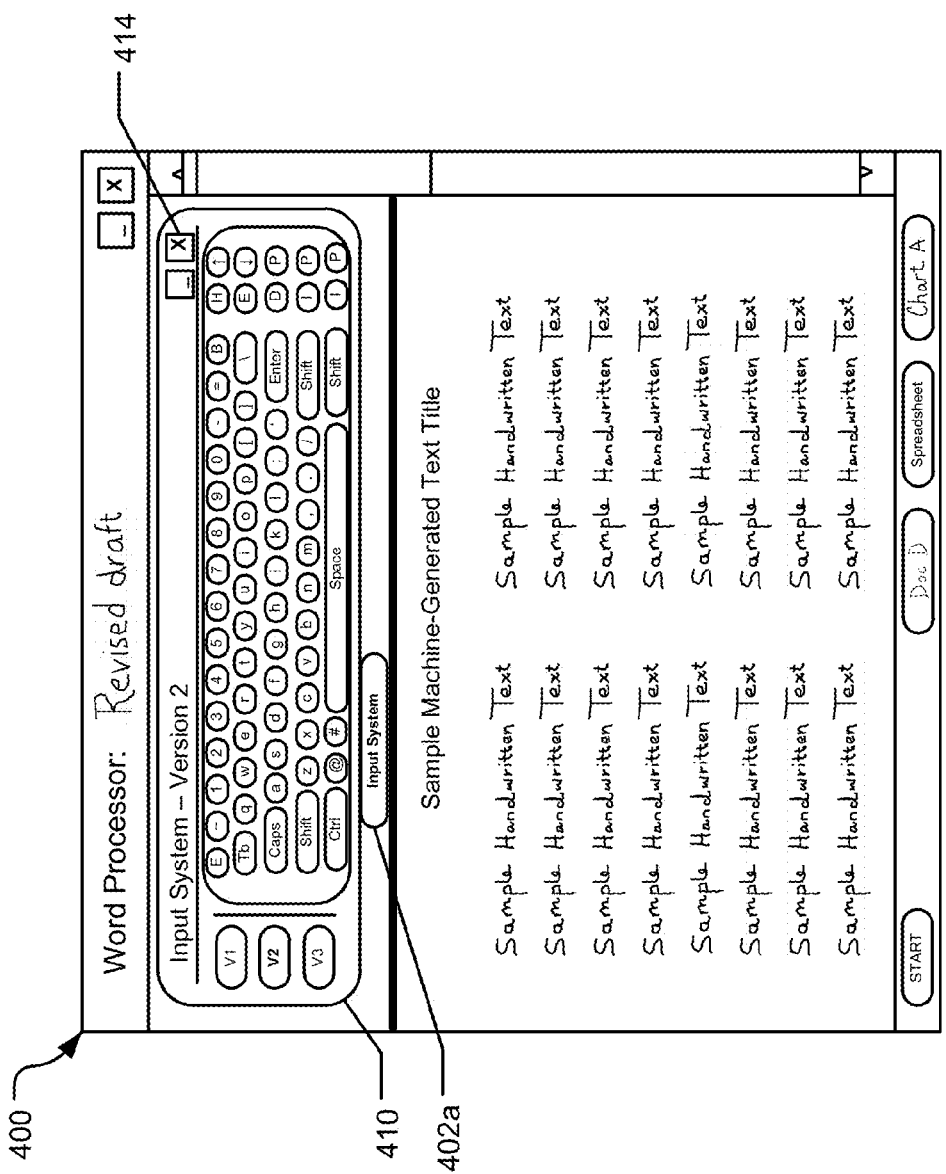

FIGS. 5D through 5F illustrate an example deployment of a text input system from user interaction with activation targets 402 and/or 402a located at the top of a display screen 400. When a user interacts with the text input system activation target 402a, as shown in FIG. 5D (e.g., by "tapping" on the activation target 402a with the pen 404, hovering over it with the pen 404 for longer than a predetermined time period, etc.), this action will launch or activate the text input system and cause it to deploy. FIG. 5E illustrates an example of a text input system 410 (in the form of a soft keyboard in this example), as it is being deployed. While the text input system 410 may be displayed in any desired manner without departing from this invention, in this illustrated example, tapping the activation target 402a in its expanded state (as shown in FIG. 5D) will initiate an animation in which it appears that the text input system 410 scrolls down from the top of the display screen 400 in the direction of arrow 520. Again, this animation or scrolling action associates and reinforces the purpose and function of activation target 402a in the user's mind, and the continued presence of the activation target 402a at the bottom of the text input system 410 during the scrolling or animation further associates and reinforces the purpose and function of activation target 402a in the user's mind. Of course, if desired, the activation target 402a need not appear during this deployment procedure.

FIG. 5F illustrates an example of display device 400 with the text input system 410 of this example fully deployed. As shown, in this illustrated example, the text input system 410 is fully displayed and is available for data input (e.g., using an electronic pen or other suitable input device). Of course, any type of text input system may be used without departing from this invention. Additionally, the continued presence of the activation target 402a at the bottom of the displayed text input system 410 further associates and reinforces the purpose and function of activation target 402a in the user's mind. If desired, however, the activation target 402a need not be visible when the input system 410 is fully deployed. If desired, the user may change the size and/or location of the text input system 410, e.g., using pen dragging techniques or other techniques, as generally described above in conjunction with FIG. 4D, including through the use of size and location changing techniques that are known and used in the art.

When the user has finished using the text input system (or at any other appropriate or desired time), the system can be re-stowed in any suitable or desired manner without departing from the invention. For example, the user could indicate that he/she has finished using the text input system by tapping the pen in the system's "close" icon 414, by again tapping the expanded activation target 402a. and/or in any other desired manner. The text input system 410 may disappear in any desired manner, such as by simply disappearing or fading away, by scrolling back into the top of the display 400 (opposite the scrolling described above in connection with FIGS. 5D through 5F), through some other animation technique, or the like. Scrolling backward, as described above, can help further reinforce the presence and use of the activation targets 402 and/or 402a in the user's mind. In at least some examples of the invention, once the text input system 410 is closed, the display 400 will return to the state shown in FIG. 5D or to a state with the activation target in a collapsed or other pre-interaction state (e.g., like state 402 described above). Optionally, if desired, after the text input system 410 is closed, the system could return the display 400 to the state shown in FIG. 5D for a time (with the expanded activation target 402a displayed), and then finally return to the collapsed state as described above, e.g., if there is no user interaction with the expanded activation target 402a within a predetermined time period and/or if a user takes other action away from the activation target 402a. Of course, many variations in the manner and/or appearance of the display and/or activation target may be used without departing from this invention.

The manner in which text input systems deploy also may vary (and optionally may be controlled by the system user) in systems and/or methods in accordance with this invention. If desired, users will be able to freely select the active "modes" of operation, which are described in more detail below. FIGS. 4A through 4D illustrate an example of systems and methods in which the text input system deploys in a "floating manner." In this manner or mode of operation, the text input system appears and acts as if it is essentially floating on top of all other display portions or panels and/or all other open applications. In at least some examples, in this floating manner, the text input system does not reserve and/or take up space in the open display portion and/or the portion of the display having focus. Also, if desired, when activated in this floating manner, the text input system will remain in place in a floating manner until it is stowed or its mode of operation is changed. For example, even if the user and/or the system changes the active application program and/or display portion being used, changes focus, or the like, the text input system in this mode will remain on top and available for use. Of course, the manner in which the text input system operates in this floating mode may vary widely without departing from the invention.

FIGS. 5D through 5F illustrate an example of systems and methods in which the text input system deploys in a "docked manner." In this manner or mode of operation, the text input system, when launched, reserves space on the screen for itself. Therefore, when the text input system activated, as evident from a comparison of FIG. 5D with FIGS. 5E and 5F, some data originally present on the display screen 400 no longer appears once the text input system is activated (e.g., the display area for the application program becomes smaller and less information is displayed in this example). Alternatively, if desired, as described above in conjunction with FIGS. 1A through 1C, in this "docked" mode, the text input system may reserve space on the display screen for itself and the information originally present on the screen when the text input system was launched may be displayed in a smaller size so that all (or substantially all) of the originally displayed data can remain displayed even when the text input system is being utilized. In this "docked" manner of operation, in at least some examples, the text input system will remain at the set location on the screen (optionally movable by the user), regardless of whether the user and/or system changes the active application program and/or display portion or panel being used, in focus, or the like. While the "docked" manner of operation may be used at any desired location on the display screen, generally this manner of operation is better suited for use when the text input system is oriented to deploy from and/or at the top or bottom edges of the display screen. If desired, systems and methods in accordance with at least some examples of this invention may automatically default to the "docked" mode of operation any time the text input system activation targets are placed in the top and/or bottom edges of the screen (optionally, a user may override this default selection and/or place the system in a different operating mode, without departing from the invention). Many variations in the operating characteristics of systems and methods of the invention is this "docked" mode are possible without departing from this invention.

As another option, the text input system may be arranged or designated to deploy in an "in-place" manner. In this operational mode, in accordance with at least some examples of this invention, the text input system will tie itself to a particular open field, display panel, or region (e.g., an active display panel and/or one having focus). In this example operating mode, if the user, application program, operating system, or the like switches focus away from the field or application program in which the text input system was opened and/or away from a field or application program that can accept text, the text input system will disappear and not be immediately available in the newly activated field or panel (although the text input system may be activated in this new field or panel, if desired, e.g., by the user). Then, if the user returns to and/or returns focus to the field or application program in which the text input system was initially deployed and/or to another field or application program that can accept text, the text input system will again be displayed and available upon the focus change, optionally in the same manner and at the same relative location at which it was previously deployed and located. Optionally, rather than immediately bringing up the text input system when this type of focus change takes place, an icon or dialog box may appear that gives the user an opportunity to relaunch the text input system, if desired. Also, if desired, within this "in-place" mode of operation, the text input system may be deployed in a floating manner, in a docked manner, and/or in any desired manner without departing from this invention. Of course, many variations in the operating characteristics of systems and methods in accordance with the invention in this "in-place" operational mode are possible without departing from the invention.

If desired, systems and methods according to at least some examples of the invention may include visual and/or audio indicators or reminders (e.g., associated with the activation target's location and/or activation) to inform the user of its mode of operation, e.g., before or during activation of the text input system. For example, if desired, the appearance of the activation targets may differ depending on whether the system is set to activate the target in the docked, floating, or in-place mode (e.g., rounded target edges for the floating mode v. square target edges for the docked mode, located at the very device screen 400 edge for floating or docked mode v. located at an individual panel's edge for the in-place mode, etc.). As another example, if desired, an audible indicator may be generated during hover and/or as the text input system is being deployed to indicate the set mode of operation. Other indicators or combinations of these indicators may be used, if desired, without departing from this invention. Of course, if desired, the user may change the mode of operation before or after the text input system is deployed, e.g., from a menu that may be made available, from radio buttons included with the text input system display, and/or in any other desired manner, without departing from this invention.

Of course, many variations in the user interfaces, systems, and methods associated with the text input system and its activation targets may be provided without departing from this invention. For example, there may be many variations in the manner in which the activation targets appear, the appearance or manner in which the targets switch between pre-interaction and post-interaction states, the manner in which the text input systems deploy in response to interaction with the activation targets, the manner in which the text input systems disappear, and the like. Various examples of additional features and/or modifications of user interfaces, systems, and methods according to the invention are described below.

As an initial default position, activation targets initially may appear along the left edge of the screen, centered halfway along the edge or higher, if desired. Systems and methods may return the targets to the default location, e.g., after certain conditions are met, as the result of certain actions, etc. Of course, any initial default position may be used without departing from this invention.

Typically, in user interfaces, systems, and methods according to examples of this invention, once a text input system is deployed by the user, it will return to its original location when it is again stowed, unless the user has moved the text input system while it was in use. If the text input system was moved during use (e.g., dragged to a new location by the user), user interfaces, systems, and methods according to at least some examples of the invention may display the corresponding activation targets once the text input system is stowed at the display's edge and at a level corresponding to the location of the text input system when last opened. Of course, if desired, when the text input system is stowed, the activation targets may return to their previous location, without departing from the invention. As still another alternative, if desired, when the text input system is stowed, the activation targets may return to a default position without departing from the invention. Other variations in the location of the activation targets upon stowing the text input system are possible without departing from this invention.

At least some pen-based computing systems, such as many tablet PCs, will allow users to freely change the orientation of the display screen during use between "portrait" and "landscape" orientations. At least some examples of user interfaces, systems, and methods according to the invention will position the text input system activation targets along the same relative edge and/or at a proportional location along that relative edge, based on its previous orientation, when the display screens are changed between the portrait and landscape orientations (e.g., from the right edge in landscape to the right edge in portrait). In this manner, when the orientation switch is made, the user will find the activation targets in essentially the same general location as they were located in the other orientation. Of course, other ways of handling this switch in orientation and/or positioning of the activation targets may be used without departing from the invention, such as placing the activation targets at a default position, in a last use position from that orientation, etc.

In some modes of operation and/or for some application programs, it may be desired to hide the activation target(s), at least in some situations, such as when a user is not interacting with the target(s) and/or using the text input system. For example, when making a presentation using PowerPoint® (presentation software available from Microsoft Corporation of Redmond, Wash.) or the like, a user may not wish to have the activation target present and/or may wish to have it present only under certain limited circumstances. If desired, user interfaces, systems, and methods according to at least some examples of this invention and/or for use with certain application programs or the like may be adapted to hide the activation target(s) unless or until a pen (or other user input device) is sensed at or near the edge of the display where the target is located. As another example, if desired, the activation targets in these pre-interaction interaction situations may appear in plain text, very light, faded, and/or gray, so that they remain visible but not obtrusive. Then, if the user hovers the pen and/or locates another input device near the edge (e.g., anywhere along the edge), the activation target could be displayed in its collapsed or pre-interaction state and/or in a somewhat more visible state, and/or if the user hovers the pen near the edge and near the location of the activation target, then the activation target could be displayed in its expanded state and/or in its more fully visible and/or post-interaction state. Of course, many variations in the form, appearance, and circumstances under which the various activation targets are displayed may be used without departing from this invention. In this manner, the target will not be readily visible and/or a potential distraction during the bulk of a presentation, but it can be readily located and used, if necessary. If desired, this type of "hide" mode for the activation targets may be entered automatically (e.g., as a default) when certain application programs and/or functions are activated or launched (e.g., such as a presentation, slide show, or the like).

The illustrated examples show use of a single activation target on a display screen. Of course, if desired, multiple activation targets, optionally along multiple edges of the display screen and/or in multiple open programs or panels, may be used in user interfaces, systems, and methods without departing from this invention. For example, if desired, users could provide multiple activation targets along one edge, an activation target at multiple corners, an activation target in each open application program, or the like, without departing from this invention. As still another example, a single, long activation target may be provided along an edge of the display and the text input system may be activated by tapping anywhere along this elongated target. In such systems, the text input system may be deployed at, near, or based on a predetermined relationship with respect to the location of the tap.

Finally, while the illustrated example shows use of the activation targets and text input systems of the invention in conjunction with a word processing program, use in this environment merely constitutes an example of use of the invention. Those skilled in the art will recognize, of course, that a variety of text input systems may be deployed under a great variety of circumstances, in any display panel and/or any field, and/or with any desired application program and/or operating system or the like, without departing from this invention.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. One or more computer storage hardware comprising computer-readable instructions for providing a user interface on a display device that comprises a digitizer, the user interface comprising:
   a first display mode comprising a pre-interaction condition in which a text input system activation target is not-visible; and
   a second display mode displaying a visible text input system activation target in response to detecting an interaction with a stylus at any location on the digitizer.

2. The one or more computer storage hardware of claim 1, wherein the user interface further comprises:
   a third display mode displaying a visible text input system that is activated in response to input at the text input system activation target in the second display mode.

3. The one or more computer storage hardware of claim 2, wherein the text input system is deployed in a floating mode upon receiving an input at the text input system activation target.

4. The one or more computer storage hardware of claim 3, wherein the text input system floats on top of other open applications when in the floating mode.

5. The one or more computer storage hardware of claim 1, wherein the stylus is active.

6. The one or more computer storage hardware of claim 1, wherein the text input system includes an electronic ink entry area that receives handwritten input.

7. The one or more computer storage hardware of claim 1, wherein the interaction comprises the stylus hovering over the digitizer.

8. The one or more computer storage hardware of claim 1, wherein the text input system activation target is displayed at a location of the interaction, and wherein the digitizer is a touch-sensitive display.

9. A method for activating and displaying a text input system on a display device having a digitizer, comprising:
   generating a first display mode for a user interface where a text input system activation target is not visible, the user interface including a plurality of visible content;
   receiving, at the display device, a first input with a stylus at any location on the digitizer; and
   displaying on the display device the text input system activation target in response to the first input.

10. The method of claim 9, wherein the digitizer is a touch-sensitive display for use with a user's finger.

11. The method of claim 9, further comprising activating the text input system in response to a second input in the text input system activation target.

12. The method of claim 11, wherein the text input system includes an electronic ink entry area.

13. The method of claim 12, further comprising generating digital ink in response to strokes detected through the electronic ink entry area.

14. The method of claim 13, further comprising converting the digital ink to a conventional machine-generated text and communicating the conventional machine-generated text to an open application.

15. The method of claim 9, further comprising:
   displaying the text input system as a floating interface proximate to text input areas visible on the display device.

16. A computing device, comprising:
   a display device comprising a touchscreen;
      one or more processing units; and
      one or more computer-readable storage media comprising computer-readable instructions that when executed by the one or more processing units perform operations comprising:
      generating a first display mode for a user interface that does not include a visible text input system activation target, the user interface including a plurality of visible content;
   receiving a first input with a stylus at any location on the digitizer; and
   displaying on the display device the text input system activation target in response to the first input.

17. The computing device of claim 16 wherein the first input is a hover.

18. The computing device of claim 17, further comprising activating the text input system in response to a second input in the text input system activation target, wherein the second input is a tap.

19. The computing device of claim 18, wherein the text input system includes an electronic ink entry area, a soft keyboard, or any combination thereof.

20. The computing device of claim 16, wherein the stylus is active.

* * * * *